United States Patent
Sannie et al.

(10) Patent No.: US 9,678,224 B2
(45) Date of Patent: Jun. 13, 2017

(54) SYSTEM AND METHOD FOR DETECTING NEUTRON, GAMMA AND MUON RADIATIONS WITH CONTIGUOUS PLASTICS SCINTILLATORS

(71) Applicant: COMMISSARIAT A L'ENERGIE ATOMIQUE ET AUX ENERGIES ALTERNATIVES, Paris (FR)

(72) Inventors: Guillaume Sannie, Issy les Moulineaux (FR); Gwenole Corre, Saint-Aubin (FR); Vladimir Kondrasovs, Palaiseau (FR); Stephane Normand, Isigny le Buat (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 14/915,956

(22) PCT Filed: Sep. 4, 2014

(86) PCT No.: PCT/EP2014/068865
§ 371 (c)(1),
(2) Date: Mar. 2, 2016

(87) PCT Pub. No.: WO2015/032872
PCT Pub. Date: Mar. 12, 2015

(65) Prior Publication Data
US 2016/0282481 A1    Sep. 29, 2016

(30) Foreign Application Priority Data
Sep. 6, 2013 (FR) ...................... 13 58552

(51) Int. Cl.
*G01T 1/20*     (2006.01)
*G01T 3/06*     (2006.01)
*G01T 1/203*    (2006.01)

(52) U.S. Cl.
CPC ............... *G01T 1/203* (2013.01); *G01T 1/20* (2013.01); *G01T 1/2018* (2013.01); *G01T 3/06* (2013.01)

(58) Field of Classification Search
CPC    G01T 1/167; G01T 1/28; G01T 1/204; G01T 1/2018; G01T 1/203; G01T 1/38;
(Continued)

(56) References Cited

U.S. PATENT DOCUMENTS 5,083,026 A * 1/1992 Elbaum ..................... G01T 7/00
                                                            250/364
5,231,290 A * 7/1993 Czirr ........................ G01T 3/06
                                                            250/366

(Continued)

OTHER PUBLICATIONS

Author: Natalia Zaitseva et al., Title: Plastic scintillatorswithefficientneutron/gammapulseshapediscrimination, Date: 2007, Publisher: Nuclear Instruments and Methods in Physics Research.*

(Continued)

*Primary Examiner* — Mark R Gaworecki
(74) *Attorney, Agent, or Firm* — Oblon, McClelland, Maier & Neustadt, L.L.P.

(57) ABSTRACT

A radiation detecting system, including: plastics scintillators juxtaposed to form at least one pair of contiguous plastics scintillators; a photomultiplier associated with each plastics scintillator to provide an electrical signal representative of the light signal generated in the plastics scintillator; a calculator connected to the photomultipliers and configured to: detect pulse coincidences between two electrical pulses provided by the photomultipliers associated with a pair of contiguous plastics scintillators; for each pulse coincidence, determine the time offset between the coincidence pulses relative to the pulse having the greatest amplitude taken as a zero reference; determine the number of pulse coinci- (Continued)

dences the time offset of which is included in a time offset window.

10 Claims, 2 Drawing Sheets

(58) Field of Classification Search
CPC .... G01T 3/00; G01T 7/00; G01T 1/20; G01T 3/06
USPC .......................................................... 250/362
See application file for complete search history.

(56) References Cited

U.S. PATENT DOCUMENTS

| | | | | |
|---|---|---|---|---|
| 5,866,907 | A * | 2/1999 | Drukier | G01N 33/60 250/328 |
| 5,880,469 | A * | 3/1999 | Miller | G01N 23/04 250/367 |
| 8,368,026 | B2 * | 2/2013 | Partouche-Sebban | G01T 1/20 250/368 |
| 8,901,503 | B2 * | 12/2014 | Bogorodzki | G01T 1/2008 250/367 |
| 9,081,100 | B1 * | 7/2015 | Bellinger | G01T 3/08 |
| 2004/0256566 | A1 * | 12/2004 | Gardner | G01V 5/125 250/360.1 |
| 2007/0051892 | A1 * | 3/2007 | Warburton | G01T 1/172 250/362 |
| 2009/0045348 | A1 * | 2/2009 | Stuenkel | G01T 3/06 250/390.11 |
| 2012/0043467 | A1 * | 2/2012 | Gueorguiev | G01T 1/2907 250/363.01 |
| 2012/0235046 | A1 * | 9/2012 | Nakamura | G01T 1/203 250/361 R |
| 2013/0112885 | A1 * | 5/2013 | Takahashi | C09K 11/7734 250/367 |
| 2013/0277565 | A1 * | 10/2013 | Bogorodzki | G01T 1/2008 250/367 |

OTHER PUBLICATIONS

Author: Peter E. Vanier et al., Title: Neutron-Gamma Discrimination in Plastic Scintillators, Date: 2011, Publisher: Brookhaven National Laboratory.*
Author: R. R. Hansen et al., Title: Calibration and Testing of a Large-Area Fast-Neutron Directional Detector , Date: 2000, Publisher: IEEE Transactions on Nuclear Science.*
AuthorAzaree Lintereur et al., Title: Neutron and Gamma Ray Pulse Shape Discrimination with Polyvinyltoluene , Date: 2012, Publisher: Pacific Northwest National Laboratory.*
French Search Report Issued May 23, 2014, in FR 1358552 Filed Sep. 6, 2013.
International Search Report Issued Oct. 31, 2014, in PCT/EP2014/068865 Filed Sep. 4, 2014.
R.R. Hansen, et al., "Neutron-Gamma Discrimination in Plastic Scintillators," IEEE Transactions on nuclear science, IEEE Service Center, vol. 47, No. 6, Dec. 1, 2000, pp. 2024-2028.
Peter Vanier, et al., "Calibration and Testing of a Large-Area Fast-Neutron Directional Detector", Nuclear Science Symposium Conference Record, 2007, IEEE, Oct. 1, 2007, pp. 179-184.
R. De Vita, et al., "A large surface neutron and photon detector for civil security applications", Nuclear Instruments and Methods in Physics Research A, vol. 617, No. 1-3, May 11, 2010, pp. 219-222.

* cited by examiner

SYSTEM AND METHOD FOR DETECTING NEUTRON, GAMMA AND MUON RADIATIONS WITH CONTIGUOUS PLASTICS SCINTILLATORS

TECHNICAL FIELD

The field of the invention is that of radioactivity detection, in particular for detecting a radioactive source possibly passing in the vicinity of a security detector.

The installation of devices for detecting radioactivity is applicable for example to vehicle and pedestrian accesses to nuclear facilities and numerous public places, such as ports for sea containers, airports, stations, customs.

STATE OF PRIOR ART

It is attempted to make radioactivity monitoring detectors which are of a great sensitivity for the purpose of quickly detecting the potential radioactivity when moving vehicles and people pass therethrough. It turns out in particular to be necessary to discriminate the radiation parts coming from neutrons from parts coming from gammas and muons.

Measuring neutrons was made in the past with Helium 3-based detectors. But, for about ten years, manufacturers who develop people and good monitoring detectors face the rarity of Helium 3 and the increasing cost of these detectors.

The use of plastics scintillators has been recommended to circumvent this issue. Such plastics scintillators have the advantage to allow solid, simple to manufacture detectors, without export restrictions, not containing toxic products to be made. The low cost of plastics scintillators is further an important industrial argument.

However, to date, no simple plastics scintillator detector can achieve the purposes of standards for monitoring vehicles, that is dispensing with gamma background noise for detecting from a 2 meter-distance a Cf252 source emitting 20,000 neutrons per second in 4 $\pi$.

The drawback is that the plastics scintillator detector is of low density and delivers a pulsed signal the form of which is very similar for gammas, muons and neutrons. The difficulty encountered by the manufacturers is to make a detecting device which is both sensitive to neutrons, and which enables to dispense with gammas and muons naturally present in the environment. Furthermore, the standards impose that despite the presence of a strong intensity gamma source generating more than one million counts per second, the detector remains sensitive to neutrons coming from low intensity sources (for example generating about 10 counts per second on the detecting device).

DISCLOSURE OF THE INVENTION

The invention has the purpose to solve this difficulty, and provides for this a radiation detecting system comprising:
  plastics scintillators juxtaposed so as to form at least one pair of contiguous plastics scintillators;
  a photomultiplier associated with each plastics scintillator to provide an electrical signal representative of the light signal generated in the plastics scintillator;
  a calculator configured to:
    detect, in a time window, pulse coincidences between the electrical signals provided by the photomultipliers associated with a pair of contiguous plastics scintillators;
    for each pulse coincidence, determine the time offset between the coincidence pulses relative to the pulse having the greatest amplitude taken as a zero reference;
    determine the number of pulse coincidences the time offset of which is included in a time offset window.

Some preferred but not limiting aspects of this system are the following ones:
  the calculator is configured to select the pulse coincidences in three time offset windows, so as to discriminate neutrons, gammas and muons;
  the calculator is further configured for determining the number of pulses generated in a plastics scintillator as a function of their amplitude, and to count the number of pulses the amplitude of which is between a low threshold and a high threshold;
  it comprises at least three plastics scintillators forming at least two pairs of contiguous plastics scintillators;
  a cadmium or gadolinium sheet is interposed between the plastics scintillators of the at least one pair of contiguous plastics scintillators;
  the plastics scintillators have a parallelepiped shape;
  the plastics scintillators have a transverse cross-section with decimetric dimensions;
  the plastics scintillators are scintillators with a multi-decimetric length;
  the detection time window for detecting the pulse coincidences is lower than +/−50 ns.

According to a second aspect, the invention relates to a radiation detecting method, comprising the following steps implemented by a calculator connected to photomultipliers associated with juxtaposed plastics scintillators so as to form at least one pair of contiguous plastics scintillators:
  detecting, in a time window, pulse coincidences between the electrical signals provided by the photomultipliers associated with a pair of contiguous plastics scintillators;
  for each pulse coincidence, determining the time offset between the coincidence pulses relative to the pulse having the greatest amplitude taken as a zero reference;
  determining the number of pulse coincidences the time offset of which is included in a time offset window.

BRIEF DESCRIPTION OF THE DRAWINGS

Further aspects, purposes, advantages and characteristics of the invention will better appear upon reading the following detailed description of preferred embodiments thereof, given by way of non-limiting example, and made in reference to the appended drawings in which.

DETAILED DISCLOSURE OF PARTICULAR EMBODIMENTS

Figure 1A:
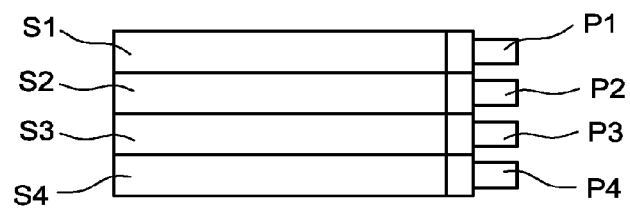
FIGS. 1a and 1b illustrate the arrangement of plastics scintillators used in a detecting device according to the invention.
Figure 1B:
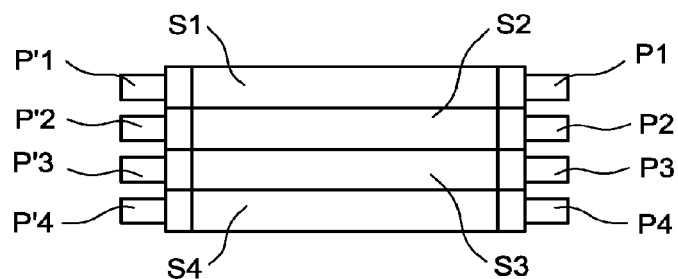
Figure 2:
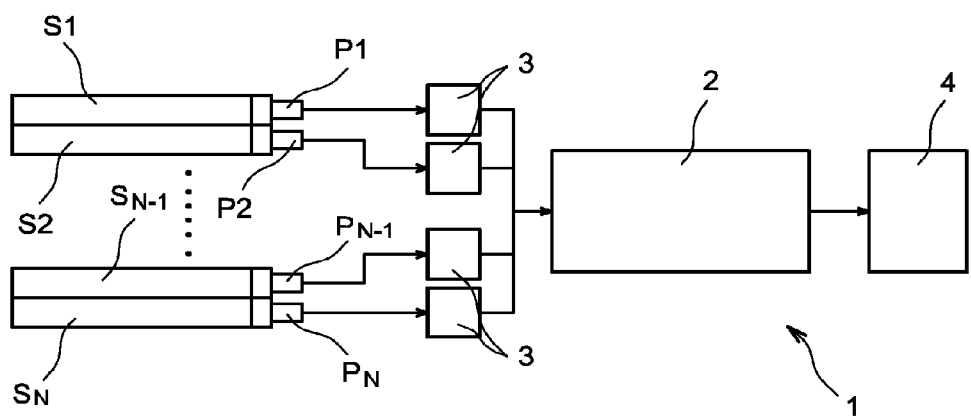
FIG. 2 illustrates an embodiment of a detecting system according to the invention.

In reference to FIGS. 1a, 1b and 2, the invention relates to a radiation detecting system 1 comprising plastics scintillators S1-S4, S1-$S_N$ juxtaposed so as to form at least one pair of contiguous plastics scintillators.

The plastics scintillators, the number of which can range from two to a few tens, are thus placed in contact with each other. The number of plastics scintillators is preferentially at least three, so as to form at least two pairs of contiguous plastics scintillators. In FIGS. 1a and 1b, four scintillators are used enabling three pairs of contiguous plastics scintillators S1-S2, S2-S3 and S3-S4 to be made. It will be seen that the scintillators are identical; these are for example EJ-200 scintillators from Eljen Technology Company.

The scintillators have preferably a parallelepiped shape, and have preferably a transverse cross-section with decimetric dimensions and a multi-decimetric length, for example 10*10*100 cm.

The parallelepiped geometry offers a high detection area and a planar interface between scintillators. The significant length enables interactions distant by 50 cm on average to be collected which enables pulses to be separated and then temporally selected. The decimetric dimensions enable the quick interacting particles (for example muons and high energy gammas) to be discriminated from the slow particles (like neutrons).

In a possible embodiment, a cadmium or gadolinium sheet is interposed between the contacting faces of the plastics scintillators of at least one pair of contiguous plastics scintillators. This sheet, having for example a thickness between 0.1 to 5 mm, can be placed on all the faces of a scintillator. Resorting to such a sheet turns out to be advantageous in that the interaction of neutrons with cadmium, gadolinium or any other material with an equivalent effective cross-section of interaction with neutrons promotes the creation of prompt gammas collected by the plastics. The system sensitivity is thus improved because of the presence of such a sheet, with a gain of 10 on the native intrinsic efficiency of the scintillating plastics for detecting neutrons.

At least a photomultiplier P1-P4, P'1-P'4, P1-$P_N$ is associated with each plastics scintillator to provide an electrical signal representative of the light signal generated in the plastics scintillator. A photomultiplier is arranged at one end of the plastics scintillator and enables an interaction to be located along the scintillator.

As illustrated in FIGS. 1a, a photomultiplier P1-P4 can be associated with each scintillator S1-S4. Two photomultipliers P1-P4, P'1-P'4 can also be used per scintillator S1-S4, each placed at one of the ends of the scintillator as illustrated in FIG. 1b. The use of two photomultipliers per scintillator has the advantage to enable muons, which pass through and interact along the detectors, to be better distinguished from neutrons, which show localized interactions in a (decimetric) zone of the detector.

In reference to FIG. 2, the detecting system 1 also includes a calculator 2 connected to the photomultipliers P1-$P_N$ through analog-digital converters 3. The system 1 can also include a man-machine interface module 4, for example a screen on which the results of the measurements are rendered.

The calculator is configured to implement an algorithm described hereinbelow which enables pulses generated in the detectors to be selected as a function of the physical properties of the neutron, gamma and muon particles, in particular the differences in speed and energy. The speed is reflected by a relative time offset date between two pulses and a pulse duration, whereas the energy is reflected by the pulse amplitude.

The calculator compares signals from a pair of contiguous scintillators, this comparison being advantageously made for each pair when there are several of them, for detecting pulses from a same type of nuclear radiation (high and low energy gamma, neutron and muon).

The neutrons interact in a plastics scintillator in two times. The quick neutrons generate collisions with hydrogen nuclei in plastics detectors. These elastic collisions move a recoil proton at each collision. The recoil protons ionize the electronic layers of the plastic atoms which results, by energy transfer, in light emission. The average energy released by the recoil protons is about 0.1 to 0.4 MeV.

Then, the neutrons interact with Cadmium to create a prompt gamma flash with a very high energy of about 8 MeV, which in turn will interact with the plastics.

The first and second interactions of the neutron with the detecting system are separated in time by 20 ns (from 4 to 40 ns) on average. Furthermore, the energy level of both these interactions is very different. The neutrons move at a speed proportional to their energy, that is about 1.5 cm/ns for a 2 MeV energy. The gamma flash moves at light speed, that is 30 cm/ns.

Thus, for neutrons, a first peak with a low amplitude coming from the recoil proton followed by a second peak with a high amplitude from the gamma flash is observed on the contiguous scintillators.

The gammas from 60 KeV to 2 MeV interact with the plastics scintillators with a great efficiency. The gammas move at the speed of 30 cm/ns and are detected almost simultaneously in the different scintillators. And a first peak with a high amplitude followed almost instantaneously by a second Compton peak with a lower amplitude is detected on the contiguous scintillators. As regards muons, two almost simultaneous peaks with a same amplitude are detected on the contiguous scintillators.

The calculator of the detecting system uses these properties in the following way to discriminate neutrons, gammas and muons.

The calculator is first configured to detect, in a time window, pulse coincidences between the electrical signals provided by the photomultipliers associated with a pair of contiguous plastics scintillators. The time window is preferably lower than +/−50 ns, for example +/−40 ns. The small duration of this window enables, after two coincidence pulses have been detected, the calculator to be available for detecting the following coincidences. By way of comparison, systems working by detecting delayed neutrons have to mobilize electronics for some 100 000 000 ns, instead of 40 ns for the system according to the invention.

The calculator is further configured for determining, for each pulse coincidence, the time offset between the coincidence pulses relative to the pulse with the greatest amplitude taken as a zero reference.

Figure 3:
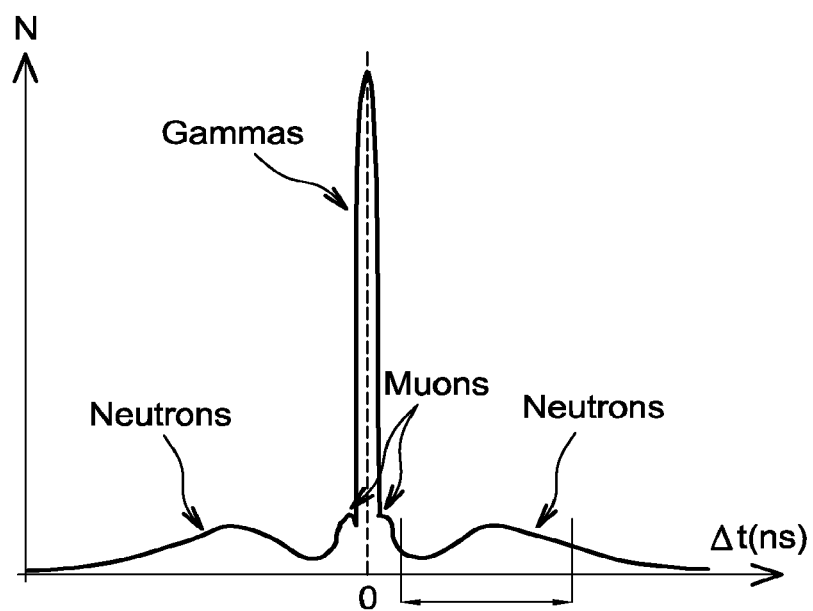
FIG. 3 represents the number of pulse coincidences as a function of their time offset relative to the pulse with the greatest amplitude taken as a zero reference.

In FIG. 3 is represented the number N of pulse coincidences as a function of their time offset Δt as determined by the calculator. Thus, pulses which interact almost simultaneously are discriminated from those which interact with a delay of a few tens nanoseconds.

The gamma coincidences are thus centred about the time reference 0. The gammas are indeed the quickest particles to interact in two neighbouring plastics detectors. They form a centre peak on the time spectrum (from −3 to +3 ns overall).

The measurement of the time deviation of the pulses generated by the muons the energy of which is very high (20 GeV) is slightly overestimated because of the electronic saturation. Consequently, the muons on the time spectrum are distributed on either side at the foot of the gamma peak where they form first bumps (from −10 to −3 ns and from 3 to 10 ns overall). The neutrons, 5 to 10 times slower than gammas, always have a delay and form second bumps on the time spectrum (from −40 to −10 ns and from 10 to 40 ns overall) on either side at the foot of the gamma peak.

The calculator is further configured to determine the number of pulse coincidences the time offset of which is included in a time offset window. Thus, the pulse coincidences involving a particular type of nuclear radiation can be selected. A time deviation window comprising deviations lower than 3 ns in absolute value enables gammas to be counted, whereas a time offset window comprising the offsets between 3 and 10 ns in absolute value enables the muons to be counted, and a time offset window comprising the offsets between 10 and 40 ns in absolute value enables the neutrons to be counted.

Considering an additive gamma source at 1 M c/s (counts per second), and three scintillators, there are about 300 000 c/s per scintillator, that is 1,200 counts on a 40 ns-time window. The muons also participate to the background noise from 4 to 12 c/s according to the position of the scintillators with respect to zenith. The detecting system according to the invention enables this background noise to be reduced in neutron detection (it is then close to zero thanks to the muon isolation), such that the detection of a very small amount of neutrons (lower than 10 c/s) is made possible, as well as the detection of neutrons in the presence of an intensive additive gamma source.

In a possible embodiment, the calculator can further be configured for determining the number of pulses generated in a plastics scintillator as a function of their amplitude. The pulses are then discriminated by a low threshold S1 and a high threshold S2, only the pulses included between these thresholds being counted. The pulses originating from the comptons of gamma radiations the amplitude of which is always much lower (overall 10 times lower) than that of prompt gammas can thus be removed.

Figure 4:
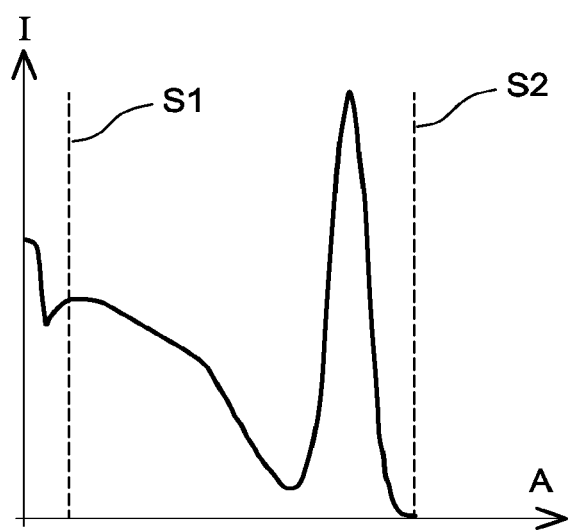
FIG. 4 represents a pulse filtering as a function of their amplitude that can be implemented in a possible embodiment of the invention.

In FIG. 4 is represented such a filtering of pulses as a function of their amplitude, in an energy spectrum representing the number of pulses generated I as a function of their amplitude A. It follows from this filtering an improvement in the energy resolution (the low energy spectrum displays counting values close to zero instead of very high values) which makes the identification of a gamma emitter radio isotope with a low energy such as Americium 241 to 59 keV possible.

The invention is not restricted to the detecting system as previously described, but also extends to the method implemented by the calculator, in particular carrying out the following steps of:

detecting, in a time window, pulse coincidences between the electrical signals provided by the photomultipliers associated with a pair of contiguous plastics scintillators;

for each pulse coincidence, determining the time offset between the coincidence pulses relative to the pulse having the greatest amplitude taken as a zero reference;

determining the number of pulse coincidences the time offset of which is included in a time offset window.

And the invention also extends to a computer program product including code instructions for carrying out said steps when the program is run on a computer.

The invention claimed is:

1. A radiation detecting system comprising:
   plastics scintillators juxtaposed to form at least one pair of a first and a second contiguous plastics scintillators;
   a photomultiplier associated with each plastics scintillator to provide an electrical signal representative of a light signal generated in the plastics scintillator;
   a calculator configured to:
      detect pulses coincidences, wherein a pulses coincidence is detected when, in a time window, a first pulse is detected in the electrical signal provided by the photomultiplier associated with the first scintillator of a pair of contiguous plastics scintillators, and a second pulse is detected in the electrical signal provided by the photomultiplier associated with the second scintillator of the pair of contiguous plastics scintillators;
      for each pulses coincidences, determine a time offset between the first and the second pulses relative to the one of the first and second pulses which has a greatest amplitude; and
      determine a number of pulses coincidences the time offset of which is included in a time offset window.

2. The radiation detecting system according to claim 1, wherein the calculator is further configured to determine the number of pulse coincidences in three time offset windows, so as to discriminate neutrons, gammas and muons.

3. The radiation detecting system according to claim 1, wherein the calculator is further configured to determine the number of pulses generated in a plastics scintillator as a function of their amplitude, and to count the number of pulses the amplitude of which is between a low threshold and a high threshold.

4. The radiation detecting according to claim 1, comprising at least three plastics scintillators forming at least two pairs of contiguous plastics scintillators.

5. The radiation detecting system according to claim 1, wherein the plastics scintillators have a parallelepiped shape.

6. The radiation detecting system according to claim 1, wherein the plastics scintillators have a transverse cross-section with decimetric dimensions.

7. The radiation detecting system according to claim 1, wherein the plastics scintillators are scintillators with a multi-decimetric length.

8. The radiation detecting system according to claim 1, wherein the time window for detecting the pulse coincidences is lower than +/−50 ns.

9. The radiation detecting system according to claim 1, further comprising a cadmium or gadolinium sheet interposed between the plastics scintillators of the at least one pair of the first and the second contiguous plastics scintillators.

10. A radiation detecting method, implemented by a calculator connected to photomultipliers associated with juxtaposed plastics scintillators to form at least one pair of a first and a second contiguous plastics scintillators, comprising:

detecting pulses coincidences, wherein a pulses coincidence is detected when, in a time window, a first pulse is detected in the electrical signal provided by the photomultiplier associated with the first scintillator of a pair of contiguous plastics scintillators, and a second pulse is detected in the electrical signal provided by the photomultiplier associated with the second scintillator of the pair of contiguous plastics scintillators;

for each pulses coincidence, determining the time offset between the first and the second pulses relative to the one of the first and second pulses which has a greatest amplitude taken as a zero reference; and determining a number of pulses coincidences the time offset of which is included in a time offset window.

* * * * *